United States Patent [19]

Ikegame et al.

[11] Patent Number: 5,126,983
[45] Date of Patent: Jun. 30, 1992

[54] APPARATUS FOR OPTICALLY RECORDING INFORMATION ON OPTO-MAGNETIC RECORD MEDIUM HAVING A MINIMIZED LEAKAGE MAGNETIC FIELD

[75] Inventors: Tetsuo Ikegame; Ichiro Ikari, both of Hachioji; Kunio Yamamiya, Sagamihara, all of Japan

[73] Assignee: Olympus Optical Co., Ltd., Japan

[21] Appl. No.: 507,735

[22] Filed: Apr. 12, 1990

[30] Foreign Application Priority Data

Apr. 12, 1989 [JP] Japan .................................. 1-90542
Apr. 17, 1989 [JP] Japan .................................. 1-96844

[51] Int. Cl.⁵ ...................... G11B 13/04; G11B 11/10; G11B 11/12
[52] U.S. Cl. ........................................ 369/13; 360/59; 360/114; 369/44.130; 369/44.14
[58] Field of Search ............ 369/13, 14, 44.13, 44.14; 360/59, 114, 66; 365/122

[56] References Cited

U.S. PATENT DOCUMENTS 4,660,190  4/1987  Fujii et al. ........................... 369/13

FOREIGN PATENT DOCUMENTS

| 59-139154 | 8/1984 | Japan . | |
|---|---|---|---|
| 61-21021 | 2/1986 | Japan . | |
| 61-29429 | 2/1986 | Japan . | |
| 62-285261 | 12/1987 | Japan .................. | 360/114 |
| 63-214903 | 9/1988 | Japan . | |
| 63-266643 | 11/1988 | Japan . | |

Primary Examiner—Stuart S. Levy
Assistant Examiner—Hoa Nguyen
Attorney, Agent, or Firm—Parkhurst, Wendel & Rossi

[57] ABSTRACT

Apparatus for recording opto-magnetically information on an opto-magnetic record medium in the form of the direction of the magnetization stored in a magnetic layer including an objective lens for projecting a laser light beam onto the magnetic layer of the opto-magnetic record medium, a device for generating a bias magnetic field which is applied to the magnetic layer in a direction perpendicular thereto, a supporting device for supporting the objective lens movably in a focusing direction parallel to an optical axis of the objective lens as well as in a tracking direction perpendicular both to the optical axis and an information track direction, and a driving device for moving the objective lens in the focusing and tracking directions to perform the focusing and tracking control. The driving device includes a magnetic circuit for generating a driving magnetic field and focusing and tracking coils mechanically coupled with the objective lens, portions of the focusing and tracking coils being inserted into the driving magnetic field to generate forces for moving the objective lens in the focusing and tracking directions. The magnetic circuit is so constructed that a magnetic flux leaked out of the magnetic circuit becomes minimum in a region of the opto-magnetic record medium onto which the laser light beam is focused by the objective lens, so that the leakage of the magnetic flux does not affect the bias magnetic field and thus the recording operation.

8 Claims, 17 Drawing Sheets

FIG_1
PRIOR ART
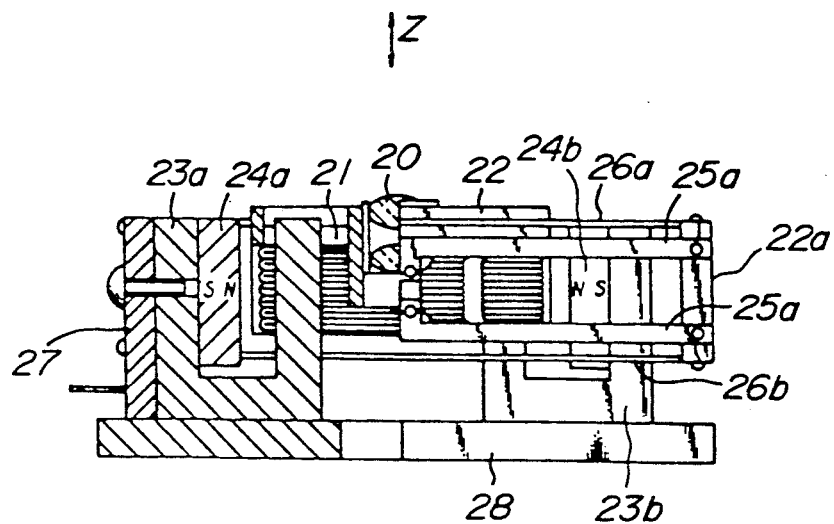
FIG_2
PRIOR ART
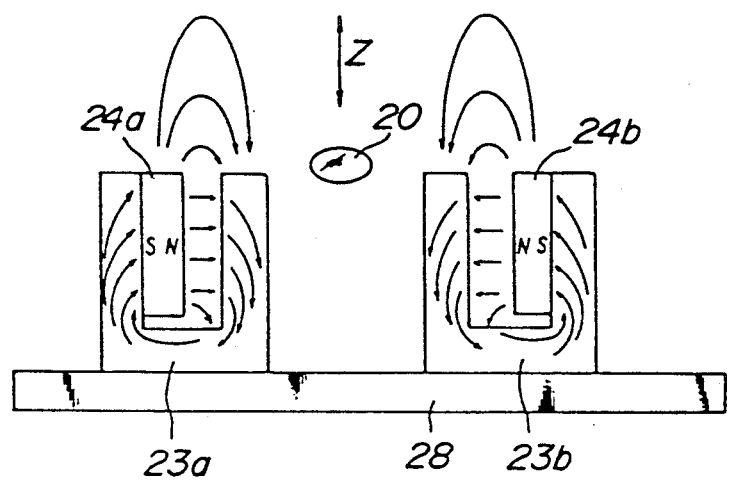

FIG_3
PRIOR ART
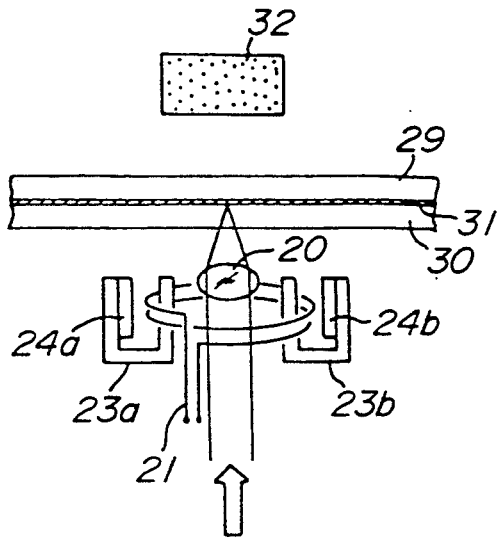
FIG_4
PRIOR ART
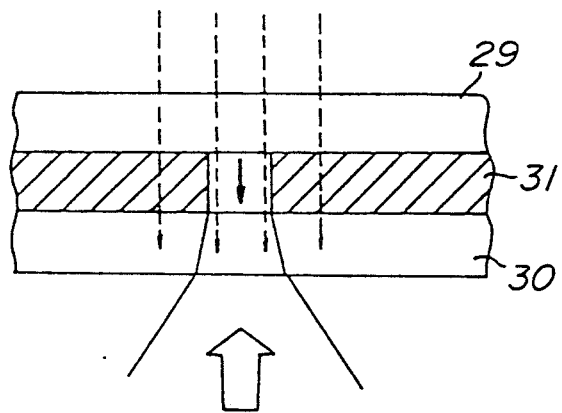

FIG_5
PRIOR ART
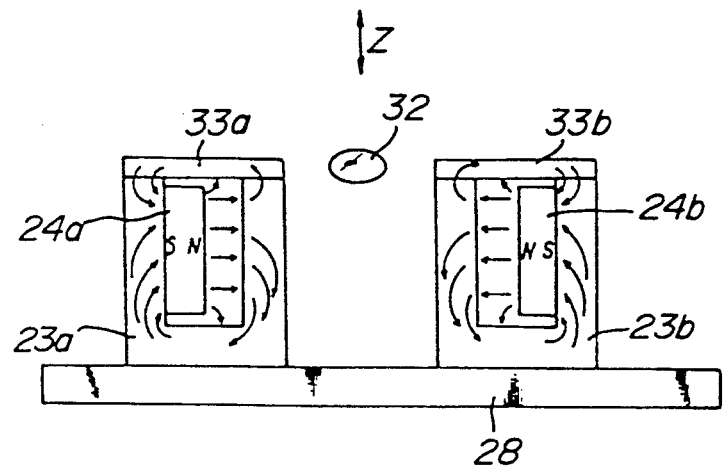
FIG_6
PRIOR ART
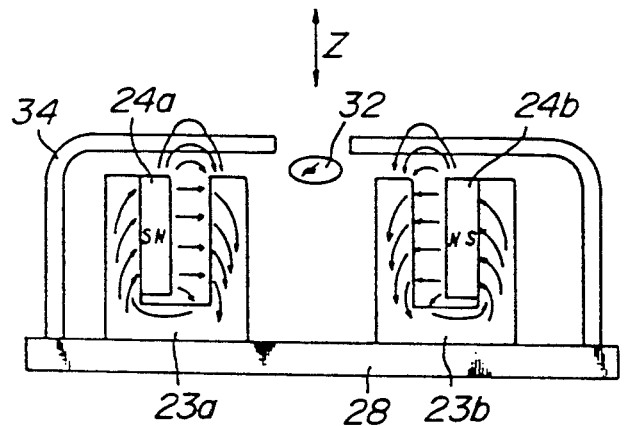

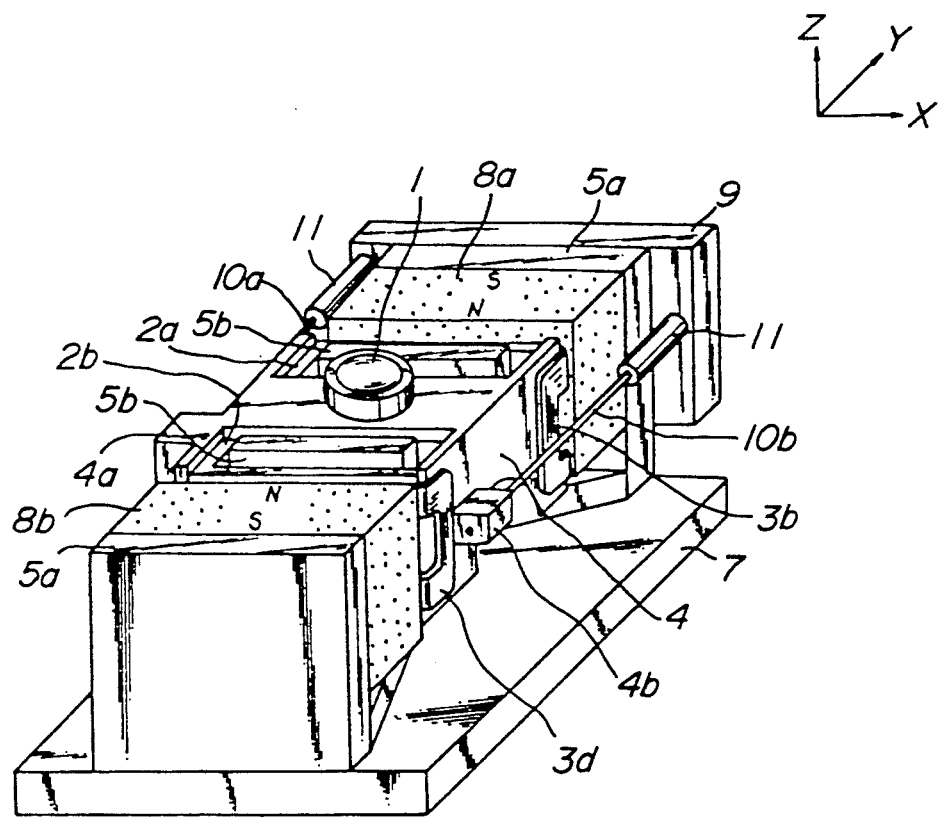
FIG_7

FIG_10

FIG_11

FIG_12

FIG_13

FIG_15
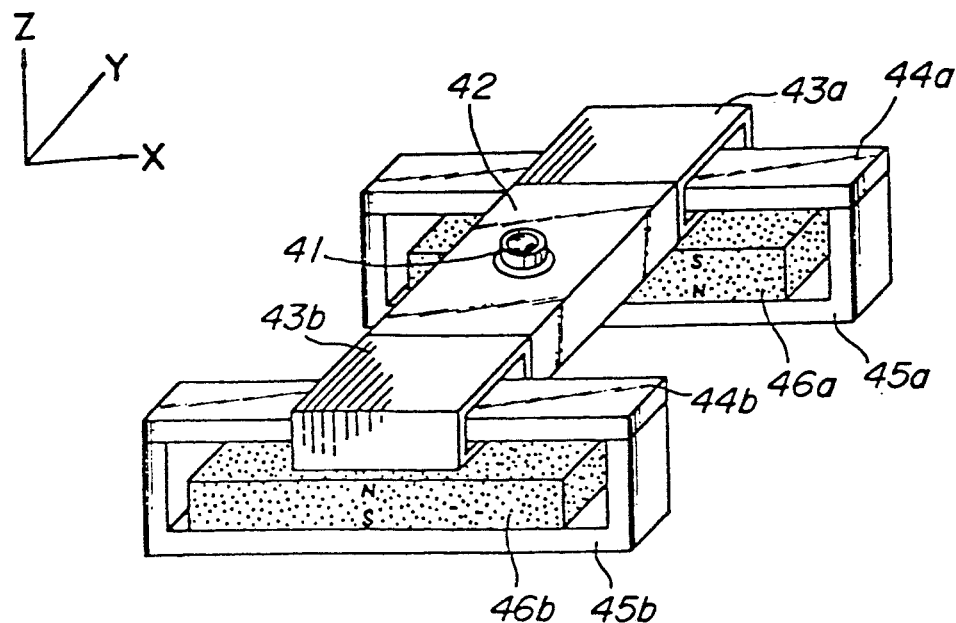
FIG_16
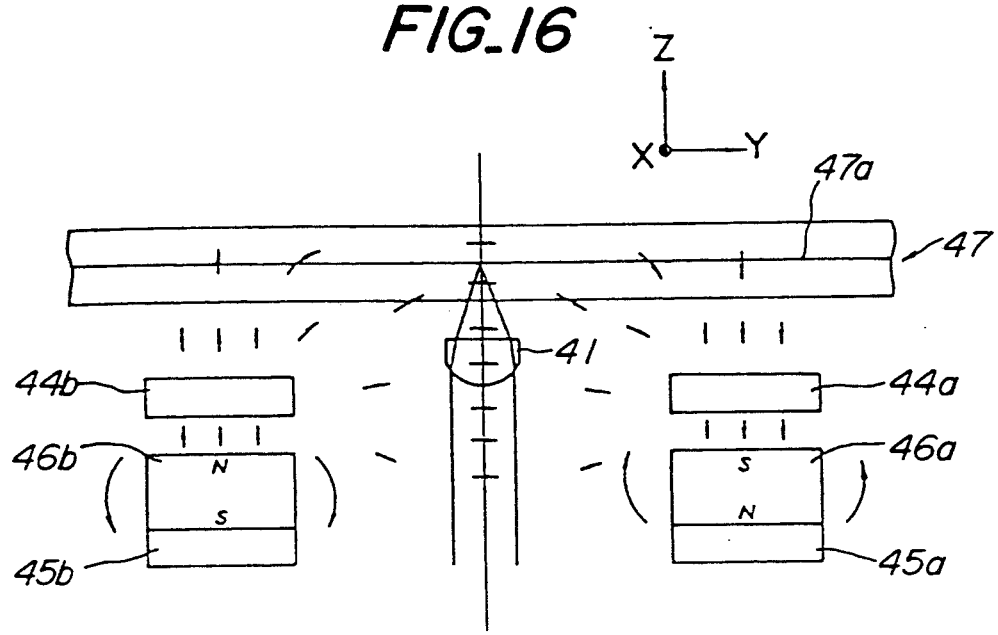

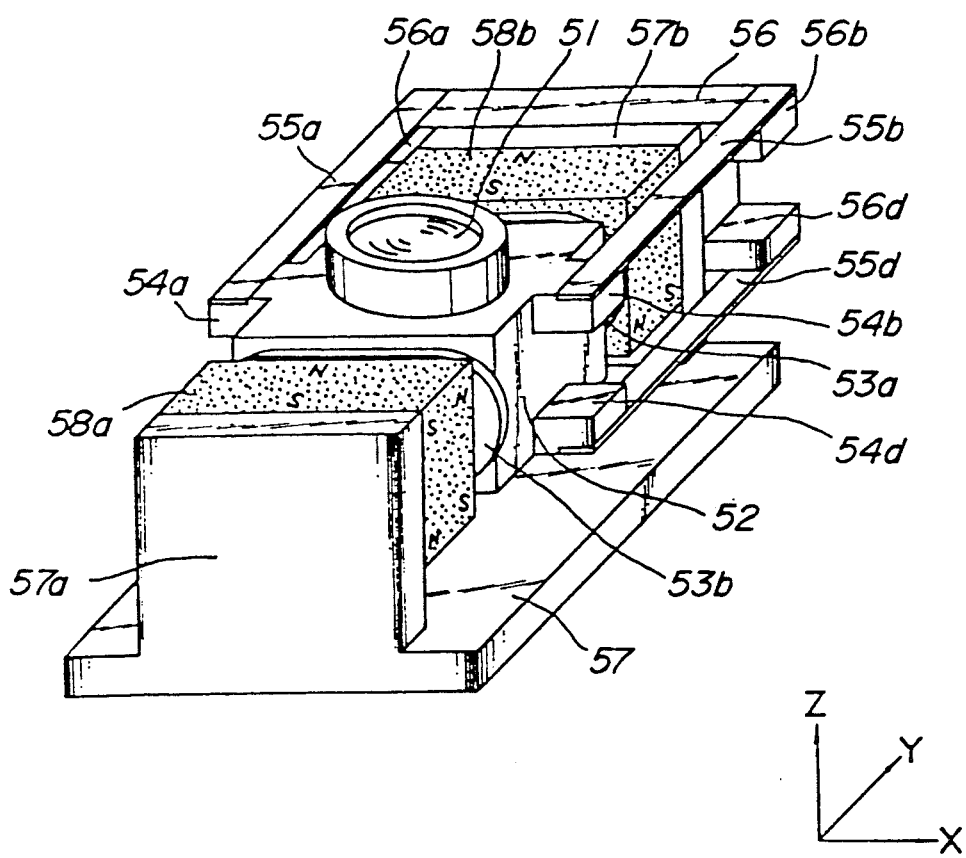
FIG_17

FIG_18
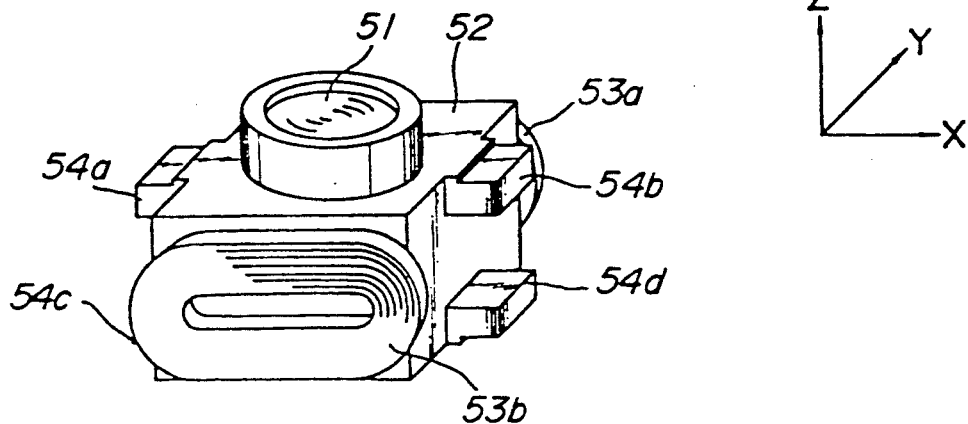
FIG_19
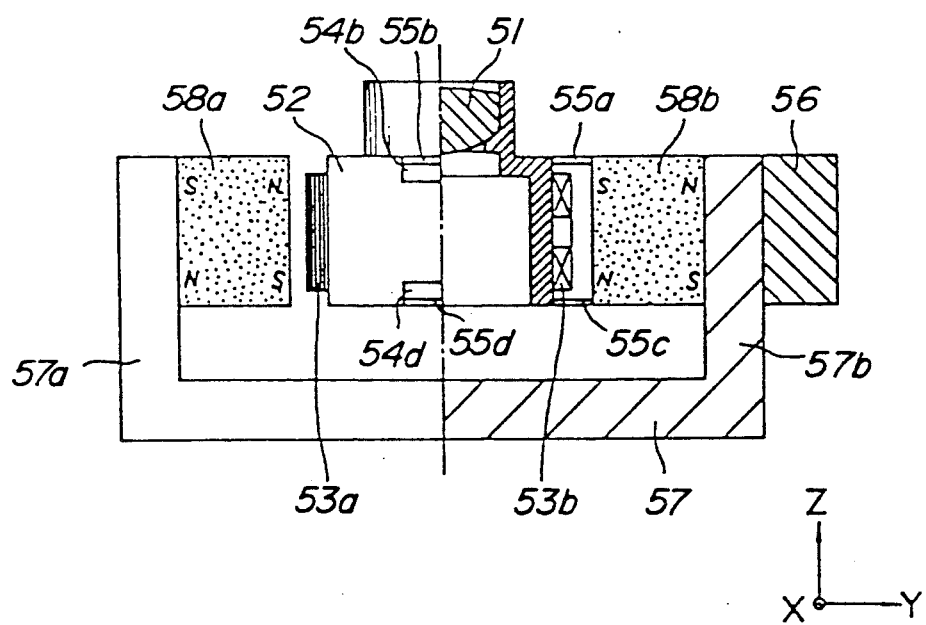

FIG_25
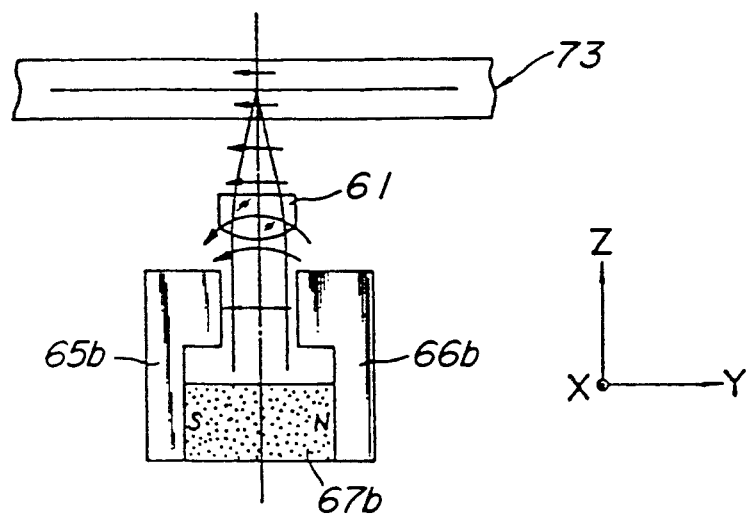
FIG_26
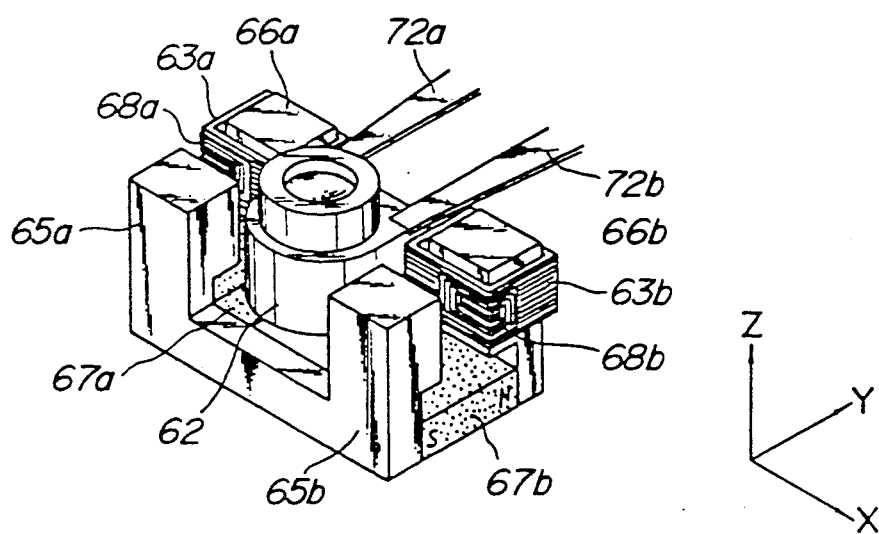

APPARATUS FOR OPTICALLY RECORDING INFORMATION ON OPTO-MAGNETIC RECORD MEDIUM HAVING A MINIMIZED LEAKAGE MAGNETIC FIELD

BACKGROUND OF THE INVENTION

1. Field of the Invention and Related Art Statement

The present invention relates to an apparatus for optically recording information on and/or from an opto-magnetic record medium including a thin film of an opto-magnetic material.

FIG. 1 shows a pick-up device of a known apparatus for optically recording information on an opto-magnetic record medium. Hereinafter, such an apparatus is called an opto-magnetic recording apparatus for the sake of simplicity. The apparatus comprises an objective lens 20 which is secured to a supporting frame 22 at its center, and a focusing coil 21 is wound around the frame. The focusing coil 21 is inserted into air gaps formed in a magnetic circuit which is constituted by yokes 23a, 23b and permanent magnets 24a, 24b secured to the yokes. The supporting frame 22 is connected to an intermediate member 22a by means of four leaf springs 25a, 25b and the intermediate member 22a is coupled with a fixing member 27 by means of four leaf springs 26a, 26b. To the fixing member 27 is also secured the yoke 23a. The fixing member 27 and the yoke 23b are secured to a base member 28. On opposite side surfaces of the supporting frame 22 there are secured flat tracking coils. In FIG. 1, these flat tracking coils are not shown. By supplying a current corresponding to a focusing error to the focusing coil 21, the objective lens 20 is moved in a Z axis direction which is parallel to the optical axis of the objective lens, so that a light beam which is projected by the objective lens toward a record medium (not shown) can be correctly focused on the opto-magnetic layer in the record medium. Further, when currents corresponding to a tracking error are supplied to the flat tracking coils, the objective lens 20 is moved in a tracking direction which is perpendicular to the Z axis as well as to the plane of the drawing of FIG. 1. In this manner, the light spot can correctly follow the information track in the record medium.

FIG. 2 is a schematic view illustrating the construction of the magnetic circuit of the known pick-up device shown in FIG. 1. In the known apparatus, the magnetic circuit is opened towards the side of the objective lens 20 and thus there is generated the leakage of magnetic field. In FIG. 2, the direction of magnetic flux is shown by arrows.

The leakage of magnetic field forms a magnetic field which is substantially parallel to the optical axis of the objective lens 20 and this leakage of magnetic field is superimposed upon the bias magnetic field which is applied to the opto-magnetic record medium for effecting the recording or erasing. Therefore, the leakage of magnetic field disturbs the bias magnetic field and the recording or erasing operation could not be performed accurately.

The recording operation for the opto-magnetic record medium is explained much more in detail hereinafter.

FIG. 3 is a schematic view of the pick-up device. The opto-magnetic record medium is generally formed to have the multi layer construction consisting of substrate 29, protection layer 30 and record layer 31 made of magnetic material. Above the opto-magnetic record medium there is arranged a permanent magnet or coil 32 for producing the bias magnetic field. In FIG. 3, the permanent magnet 32 is arranged on one side of the record medium opposite to the pick-up device. A light beam emitted by a light source is projected by the objective lens 20 onto a desired position of the magnetic layer 31 of record medium, while the objective lens is positioned at a given position by means of the driving circuit including the magnets, yokes and focusing and tracking coils.

FIG. 4 is an enlarged view showing the manner of recording or erasing the information. A part of the record layer 31 which is irradiated by the light beam is heated locally. The magnetic material of record layer 31 is heated above its Curie point, its magnetization is decreased abruptly. Next, the record layer 31 is cooled while the record layer is subjected to the bias magnetic field generated by the magnetic flux producing device 32 as shown by broken arrows. Then a portion of the record layer which has been heated by the light beam is magnetized in the vertical direction which is the same as the direction of the external bias magnetic field as illustrated by the thick solid arrow. In this manner, the previously recorded information can be erased or new information can be recorded. The direction of the magnetization is perpendicular to the plane of the record layer 31.

Upon reproduction, a polarized light beam having the intensity which is weaker than that of the recording light beam is made incident upon the opto-magnetic record medium. Then, the polarizing direction of the light beam reflected by the record medium is rotated in accordance with the direction of the magnetization (i.e., the recorded information) so that the original information can be reproduced by detecting the rotational direction of the polarization. It should be noted that the intensity of the external bias magnetic field is usually set in the range of 100 to 300 Oersteds.

In the known apparatus there is produced a large leakage of magnetic field toward the record medium. For instance, the intensity of the leaked magnetic field is about 50 to 150 Oersteds. Therefore, the recording magnetic field should be larger than the leakage of magnetic field, and thus it is necessary to make the bias magnetic field generating device 32 including the permanent magnet or coil large in size.

In order to avoid the above explained drawback, it has been proposed in Japanese Patent Application Laid-open Publication Kokai Sho 61-29429 to provide auxiliary yokes 33a and 33b as illustrated in FIG. 5. In this construction, the auxiliary yokes serve to close the magnetic circuit, so that the generation of the leakage of magnetic field can be avoided. However, in this known apparatus, it is necessary to provide the auxiliary yokes 33a and 33b separately from the yokes 23a and 23b, so that the number of parts is increased and the cost is increased and the manufacturing efficiency is decreased. Also, the weight of the pick-up device is increased.

In Japanese Utility Model Application Laid-open Publication Kokai Sho 61-21021, the whole magnetic circuit is covered with a protection cover 34 made of soft magnetic material as shown in FIG. 6 so as to decrease the influence of the leakage of magnetic field. In the known apparatuses, the size and weight of the whole pick-up device are increased by the provision of the auxiliary yokes 33a, 33b and protection cover 34, and thus the pick-up device cannot be moved stably at a high speed and therefore the high speed access is limited.

SUMMARY OF THE INVENTION

The present invention has for its object to provide a novel and useful apparatus for optically recording information on an opto-magnetic record medium, in which the influence of the magnetic field leaked out of a magnetic circuit for moving an objective lens can be avoided without increasing the size and weight of the apparatus, so that the objective lens can be driven stably at a high speed.

According to the invention, an apparatus for optically recording information on an opto-magnetic record medium comprises:
- an optical means having an optical element for projecting a light beam upon the opto-magnetic record medium;
- a bias magnetic field generating means for generating a bias magnetic field which is applied to the opto-magnetic record medium for recording or erasing the information on the opto-magnetic record medium; and
- a driving means for moving the objective lens in the optical means with respect to the opto-magnetic record medium in at least one direction and including a driving magnetic field generating means for generating a driving magnetic field and at least one coil which is mechanically coupled with said objective lens and has a portion which is arranged in said driving magnetic field such that said portion of coil is subjected to a force for driving the objective lens in the optical means in said direction, said means for generating the driving magnetic field being arranged such that at least a component of the driving magnetic field which is substantially parallel to a direction of the bias magnetic field at a portion of the opto-magnetic record medium onto which the light beam is focused becomes minimum.

In the apparatus according to the invention, the driving magnetic field generating means is arranged such that the magnetic field leaked out of the optical element driving magnetic field generating means becomes substantially zero at a portion of the magnetic record medium onto which the light beam is focused, so that the influence of the leakage of magnetic field can be avoided effectively and the size of the bias magnetic field generating means can be made small.

BRIEF DESCRIPTION OF THE DRAWINGS

FIG. 1 is a half cross sectional view showing a known opto-magnetic recording apparatus;

FIG. 2 is a schematic view illustrating the magnetic circuit for driving the objective lens in the apparatus shown in FIG. 1;

FIG. 3 is a schematic view depicting the manner of recording the information in the apparatus shown in FIG. 1;

FIG. 4 is an enlarged view representing the magnetization in the record medium shown in FIG. 3;

FIG. 5 is a schematic view depicting a known magnetic circuit in which the leakage of the magnetic field is removed by the auxiliary yokes;

FIG. 6 is a schematic view showing another known magnetic circuit in which the leakage of the magnetic field is avoided by the magnetic cover;

FIG. 7 is a perspective view showing a first embodiment of the opto-magnetic recording apparatus according to the invention;

FIG. 15 is a perspective view showing a third embodiment of the opto-magnetic recording apparatus according to the invention;

FIG. 16 is a schematic view illustrating the distribution of the magnetic flux in the apparatus shown in FIG. 15;

FIG. 17 is a perspective view depicting a fourth embodiment of the opto-magnetic apparatus according to the invention;

FIG. 18 is a perspective view representing the movable unit of the apparatus in FIG. 17;

FIG. 19 is a half cross sectional view of the apparatus shown in FIG. 17;

FIG. 25 is a seventh embodiment of the opto-magnetic recording apparatus according to the invention; and FIG. 26 is a perspective view showing the detailed construction of the seventh embodiment.

DESCRIPTION OF THE PREFERRED EMBODIMENTS

Figure 8:
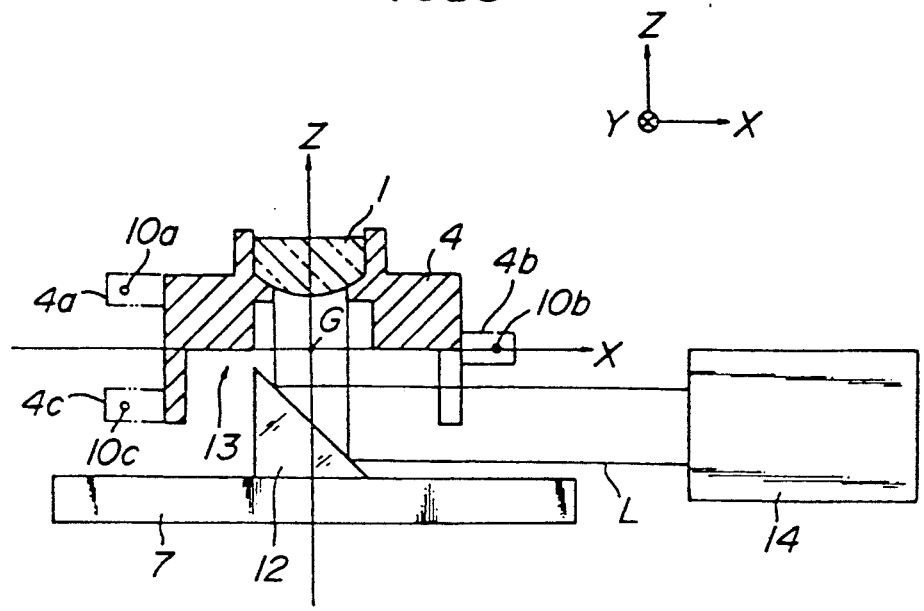
FIG. 8 is a lateral cross sectional view of the apparatus shown in FIG. 7.
Figure 9:
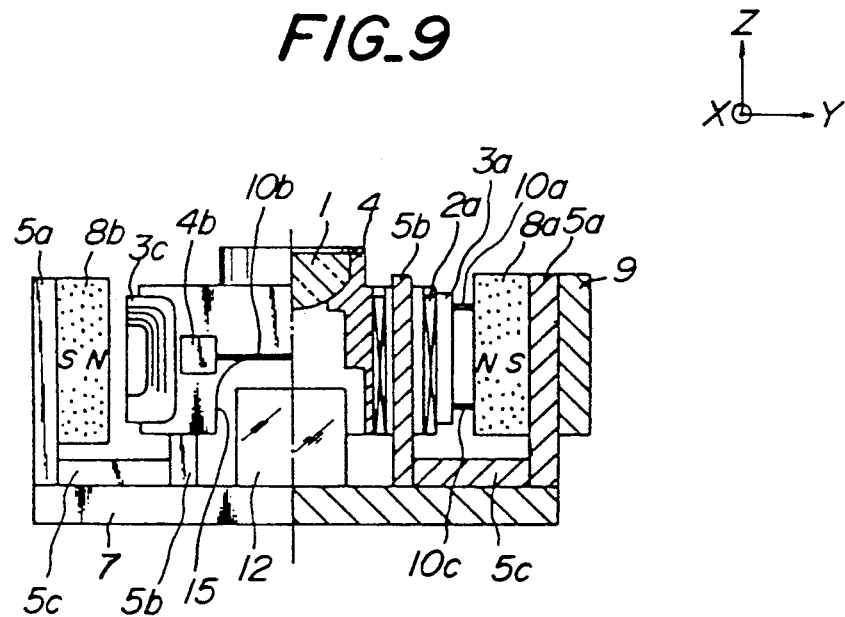
FIG. 9 is a longitudinal cross sectional view of the apparatus of FIG. 7.

FIG. 7 is a perspective view showing a first embodiment of the opto-magnetic recording apparatus according to the invention, and FIGS. 8 and 9 are lateral and longitudinal cross sectional views, respectively, cut along X-Z and Y-Z planes, respectively. An objective lens 1 is secured to a supporting frame 4 at its center. At opposite side surfaces of the supporting frame 4 viewed in Y direction are formed recesses, and focussing coils 2a and 2b are secured by adhesive onto inner surfaces of the recesses. Each of the focusing coils 2a, 2b is formed as a rectangular hollow member. On the outer surface of the focussing coils 2a, 2b and supporting frame 4 are secured four tracking coils 3a to 3d. Each of the tracking coils 3a to 3d is formed as a flat coil and is cemented to the focusing coils 2a, 2b and supporting frame 4 at respective corners thereof such that the flat coil is folded at right angles. On a base plate 7 made by pressing an aluminum plate are secured outer yokes 5a and inner yokes 5b. The inner yokes 5b are arranged such that they are inserted into spaces of the focussing coils 2a and 2b. The outer and inner yokes 5a and 5b are connected to each other by means of intermediate yokes 5c. The width of the outer yokes 5a is larger than that of the inner yokes 5b, so that the intermediate yokes 5c are tapered viewed in the direction Y. Inner surfaces of the outer yokes 5a are secured to permanent magnets 8a and 8b which are polarized such that the north poles thereof are facing to each other. Between the inner yokes 5b and the magnets 8a, 8b, there are air gaps. A fixing member 9 is secured to one outer yoke 5b and one end of three resilient wires 10a, 10b and 10c are fixed to the fixing member 9. The other ends of the wires 10a, 10b and 10c are coupled with the supporting frame 4 by means of fixing members 4a, 4b and 4c, respectively, formed integrally with the supporting frame. In this manner, the supporting frame 4 and thus the objective lens 1 are supported movably in the focusing direction Z as well as in the tracking direction X. In order to improve the damping property of the resilient wires 10, 10b and 10c, dampers 11 in the form of rubber tube are provided around the wires integrally therewith at positions near the fixing member 9. The wire 10b is arranged at a middle point between the wires 10a and 10c viewed in the Z direction so that the supporting frame 4 is brought into the balanced condition. When currents corresponding to a focusing error are supplied to the focusing coils 2a and 2b, there are generated forces in portions of the focusing coils which extend in the X direction, and the supporting frame 4 and objective lens 1 are moved in the Z direction which is parallel to the optical axis of the objective lens to effect the focusing control and the light beam emanating from the objective lens is always focused on the opto-magnetic record layer of the record medium. Further when currents corresponding to a tracking error are supplied to the tracking coils 3a to 3d, forces in portions of the tracking coils are produced which are parallel with the Z direction, so that the objective lens 1 is moved in the tracking direction X to effect the tracking control.

As best shown in FIG. 8, a mirror 12 is secured to the base plate 7 at such a position that a light beam L emitted by an optical unit 14 including a semi-conductor laser light source, collimator lens, light receiving device, etc. is reflected by the mirror 12 toward the objective lens 1. In the lower surface of the supporting frame 4 there is formed a relatively large recess 13 into which the mirror 14 protrudes. Due to the formation of the recess 13, the center of gravity G of the movable unit including the objective lens 1, supporting frame 4 and focusing and tracking coils 2a, 2a and 3a to 3d is shifted upwards, but in the present embodiment since the focusing coils 2a and 2b are arranged at a lower level and the weight adjustment is not effected, the movable unit can be made light in weight and the sensitivity of the focusing and tracking control can be increased.

The resilient wires 10a, 10b and 10c have the circular cross section and the diameter of the wire 10b is larger than that of the wires 10a and 10c by two and quarter times. The wires 10a, 10b and 10c are arranged such that their center coordinates are situated at $(-x_1, z_1)$, $(x_1, 0)$ and $(x_1, -z_1)$, while the center of gravity G is selected as the origin. As shown in FIG. 8 the fixing members 4a and 4b are positioned symmetrically with respect to a line passing through the center of gravity in the X direction. In the spring wire having the circular cross section of the diameter D and being held at its one end, the spring constant is proportional to a fourth power of the diameter ($D^4$), so that the spring constant of the wire 10b is larger than that of the wires 10a and 10c by two times. In this manner, points of the supporting frame 4 to which the force F is applied in the X and Z directions are made coincident with the center of gravity G. Therefore, the sum of moments due to the repelling forces of the spring wires 10a, 10b and 10c is zero and thus the supporting frame 4 is not tilted at all even if the supporting frame is moved in the focusing direction Z as well as in the tracking direction X.

It should be noted that the fixing member 4b for the wire 10b is provided not on the optical axis viewed in the drawing of FIG. 9, but is shifted far from the fixing member 9 and the damper 13 is arranged near the fixing member 9. Therefore, an optical path from the objective lens 1 to the mirror 12 is relatively short.

Figure 10:
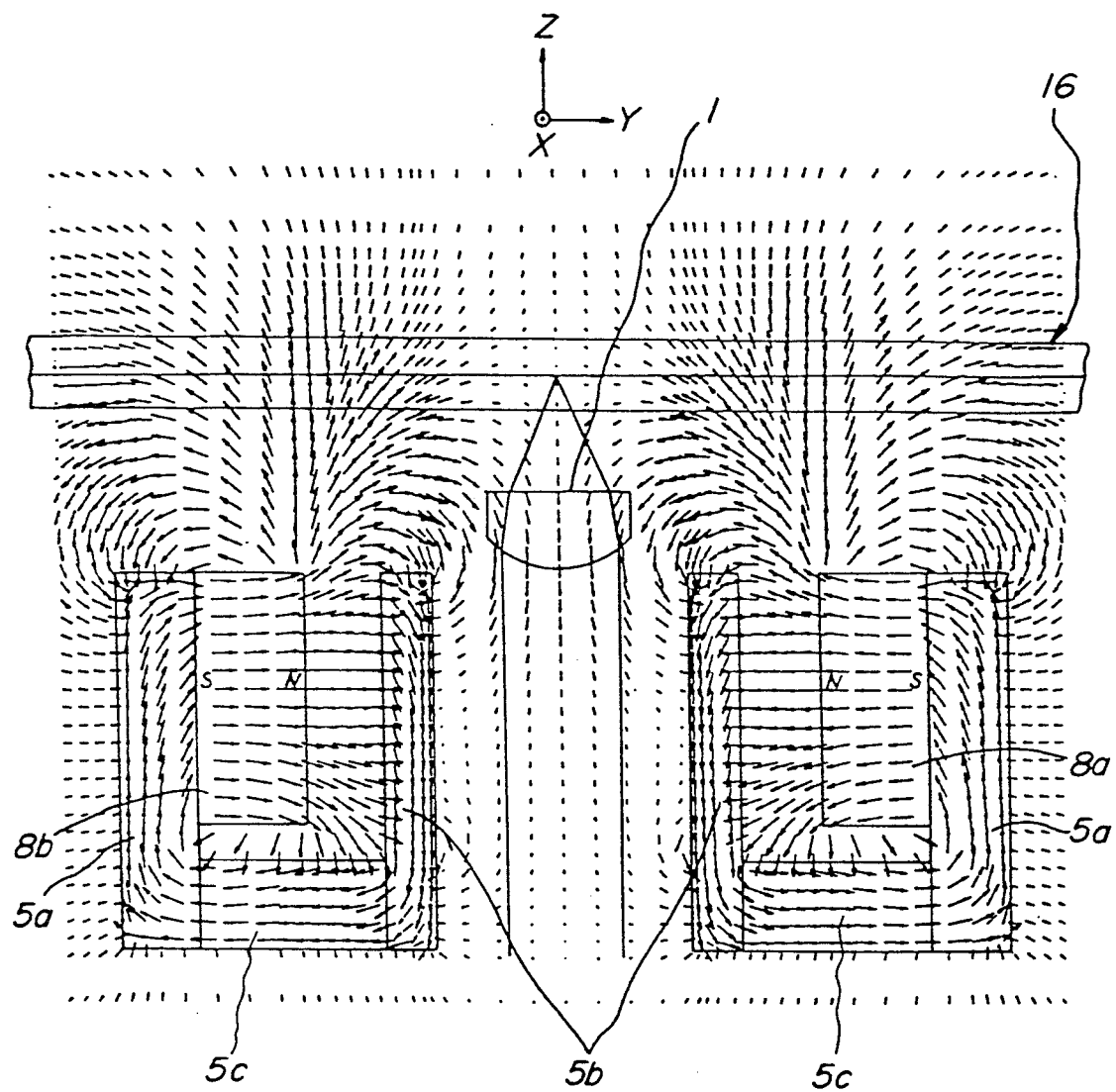
FIG. 10 is a vector diagram illustrating the distribution of the driving magnetic field.

FIG. 10 is a schematic view showing the vector diagram of the magnetic flux generated by the objective lens driving device including the permanent magnets 8a, 8b and outer and inner yokes 5a and 5b. For the sake of simplicity, the vectors having strength larger than a given value are illustrated to have the same length. As can be read from the vector diagram, the intensity of the magnetic field near the optical axis of the objective lens 1 becomes substantially zero in the information record medium 16. In a region which is closer to the objective lens 1, the magnetic field is directed downwards, but in a region apart from the objective lens, the magnetic field is directed upwards. In other words, the focal point of the objective lens 1 is set at such a position that the intensity of the magnetic field becomes minimum. In the record medium 16, the intensity of the magnetic field becomes larger with increase in a distance from the optical axis.

In the manner explained above, the Z and Y components of the magnetic field leaked out of the objective lens driving device are reduced substantially to zero at the point of the record medium 16 at which the light beam is focused. Further, the magnetic circuit composed of the magnets 8a, 8b and outer and inner yokes 5a and 5b is formed symmetrically with respect to the X axis, so that the X component of the magnetic field is also substantially zero.

Figure 11:
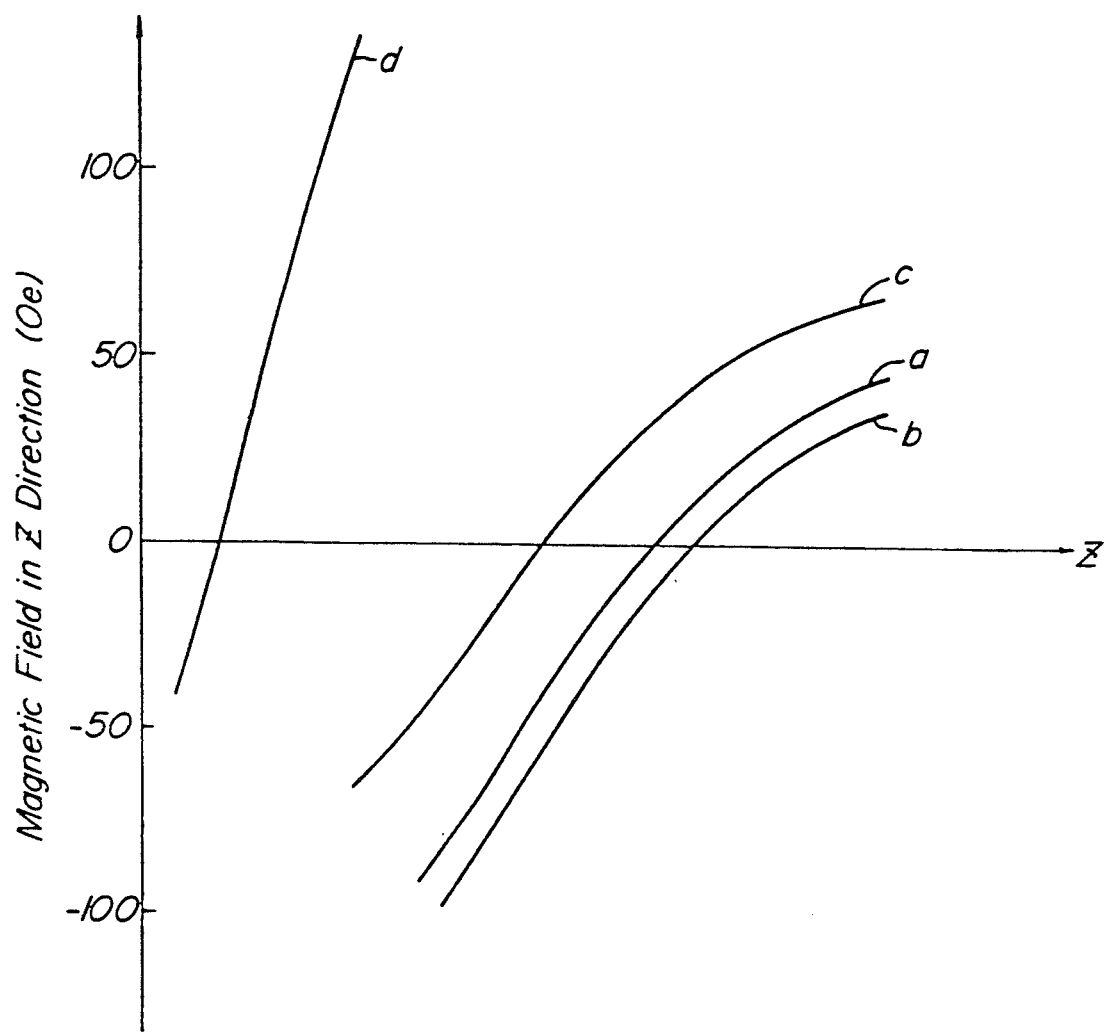
FIG. 11 is a graph showing the variation of the magnetic field in Z direction in various construction of the magnetic circuit.

FIG. 11 is a graph showing the variation of the magnetic field in the Z direction parallel to the optical axis of the objective lens 1. A curve a shows the variation of the magnetic field in the apparatus shown in FIGS. 7 to 10. As explained above, the record medium 16 is positioned at the point where the magnetic field becomes zero. This can be achieved by adjusting the distance between the magnetic circuit and the record medium and by adjusting the dimensions and/or positions of the yokes and magnets of the magnetic circuit.

Figure 12:
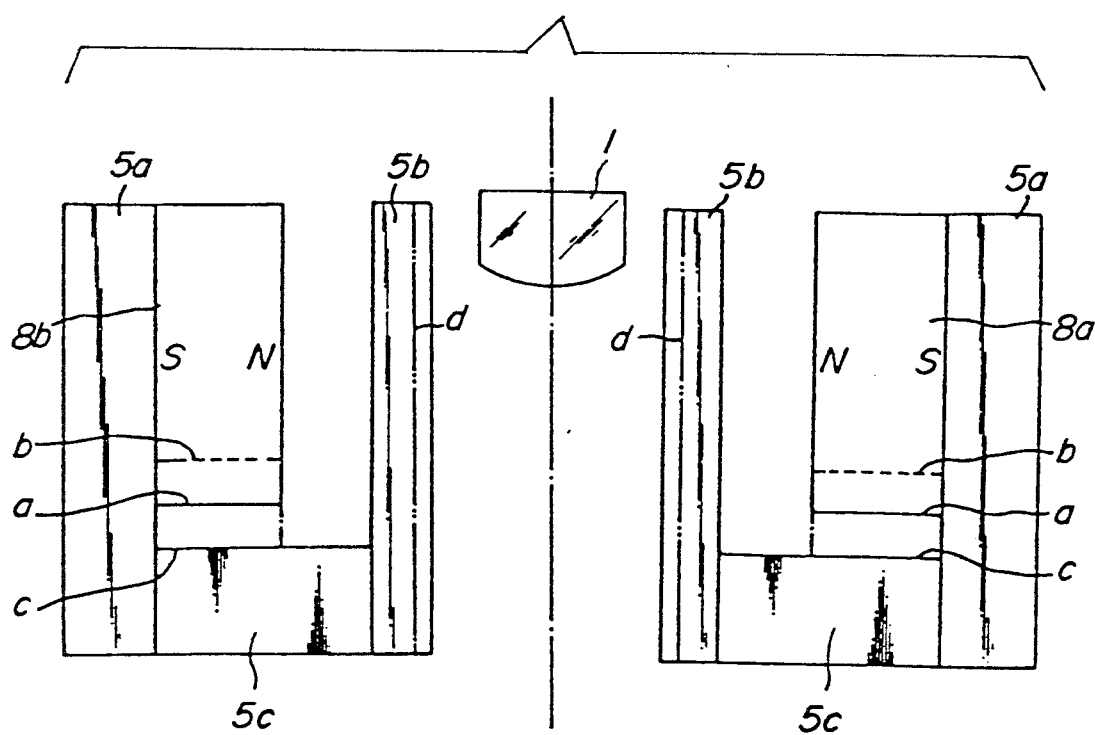
FIG. 12 is a schematic view illustrating the variation of the magnetic circuit.

FIG. 12 is a schematic view for explaining the manner of adjusting the magnetic field. If the magnets 8a, 8b are shortened as shown by broken lines b, the magnetic field is changed as represented by a curve b in FIG. 11. Then the point at which the magnetic field becomes zero is shifted upwards, i.e. in the direction apart from the magnetic circuit. If the magnets 8a, 8b are made larger such that their lower ends are brought into contact with the yokes 5c, the magnetic field is varied as shown by a curve c in FIG. 11. Then the point at which the magnetic field becomes zero is shifted towards the magnetic circuit. Further, if the thickness of the inner yokes 5b is decreased as shown by dashed line d in FIG. 12, the point of the zero magnetic field is shifted largely towards the magnetic circuit as illustrated by a curve d in FIG. 11.

According to the present invention, the magnetic circuit is constructed such that the magnetic field becomes substantially zero in the record medium, and therefore it is possible to avoid the influence of the magnetic field leaked out of the magnetic circuit without providing any additional parts and the weight of the movable portion is not increased at all. Moreover, when the point of zero magnetic field is shifted closer to the magnetic circuit, the distance between the record medium and the magnetic circuit becomes smaller so that the height of the whole apparatus can be reduced.

Figure 13:
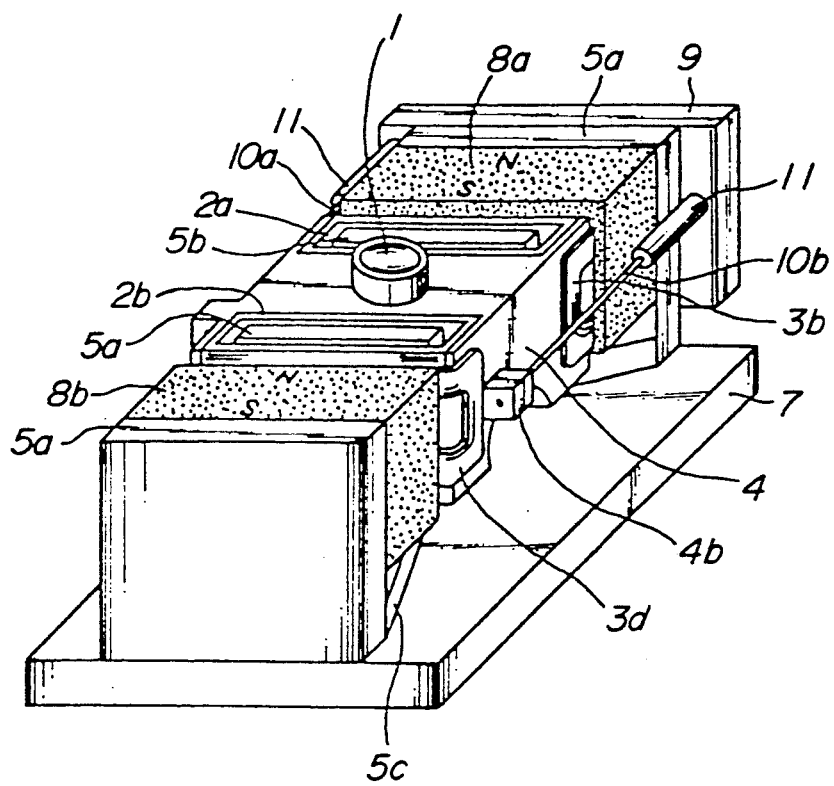
FIG. 13 is a perspective view depicting a second embodiment of the opto-magnetic recording apparatus according to the invention.
Figure 14:
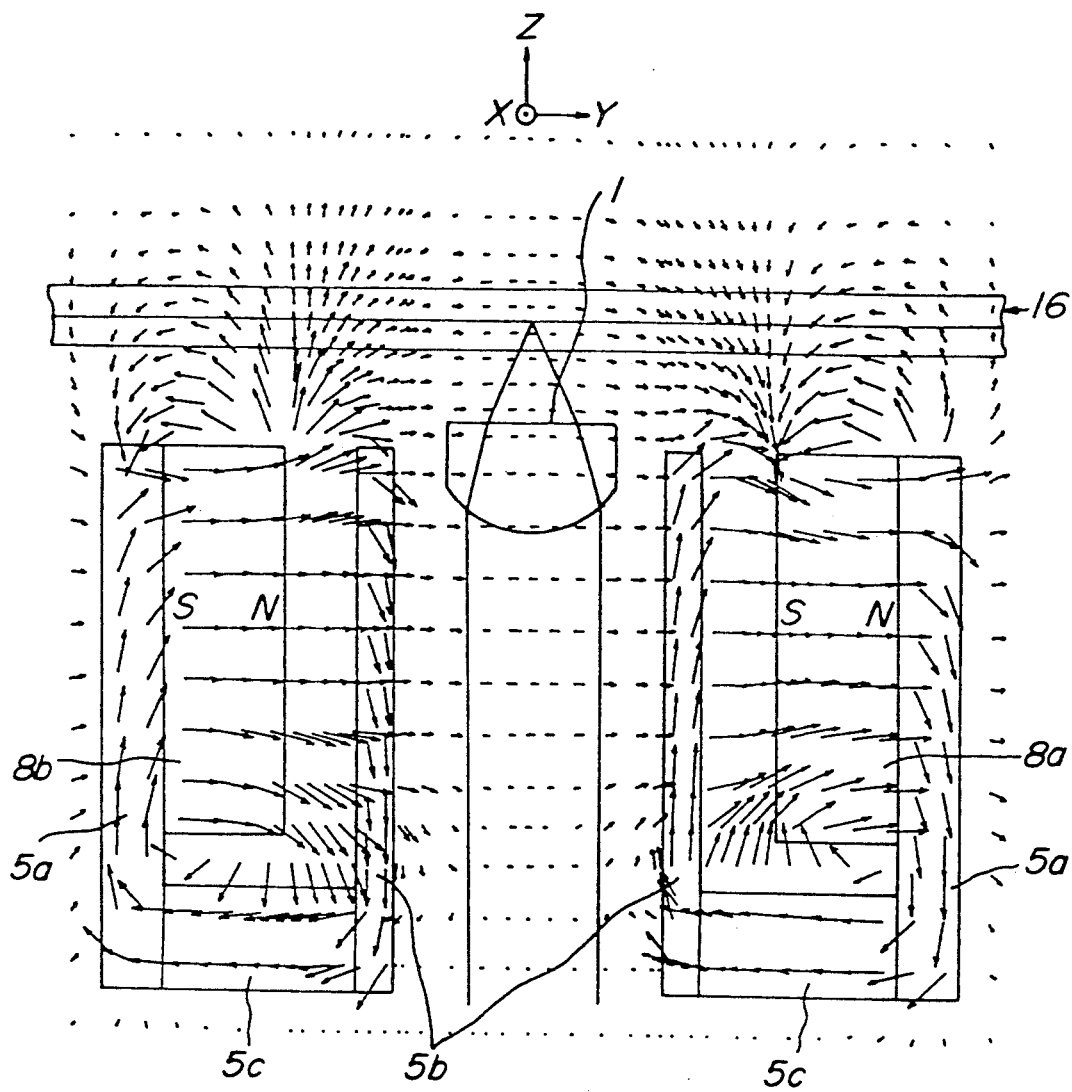
FIG. 14 is a vector diagram representing the distribution of the magnetic field in the second embodiment.

FIG. 13 is a perspective view showing a second embodiment of the opto-magnetic recording apparatus according to the present invention. The present embodiment is substantially same as the first embodiment shown in FIG. 7 so that portions similar to those of the first embodiment are denoted by the same reference numerals used in FIG. 7. In the second embodiment, the permanent magnets 8a and 8b are arranged such that the south pole of the magnet 8a is facing the north pole of the magnet 8b. That is to say, the two magnets 8a and 8b are arranged in such a manner that the different polarity poles are facing each other. The magnetic field generated by the magnetic circuit composed of the yokes 5a, 5b and magnets 8a, 8b has the distribution illustrated in FIG. 14. As can be understood from the vector diagram shown in FIG. 14, the magnetic field leaked from the magnetic circuit extends substantially in parallel with the plane of the opto-magnetic record medium 17 in a region of the record medium at which the light beam is focused. That is to say, the magnetic field becomes substantially perpendicular to the direction of the magnetization of the information in the record medium 16. The intensity of the leaked magnetic field near the optical axis of the objective lens 1 amounts to 100 to 200 Oersteds, but its Z directional component is substantially zero, so that the leaked magnetic field does not affect the recording or erasing operation.

FIG. 15 is a perspective view showing a third embodiment of the opto-magnetic recording apparatus according to the invention and FIG. 16 is a vector diagram showing the distribution of the magnetic field. In the present embodiment, an objective lens 41 is movably supported by a lens driving device 42 including a mechanism for moving the objective lens 41 both in the focusing direction Z and tracking direction X. At both ends of the lens driving device 42 viewed in the Y direction, there are secured moving coils 43a and 43b, respectively. Into the moving coils 43a and 43b are inserted yokes 44a and 44b, respectively which extend in the X direction. To the yokes 44a and 44b are secured flat U-shaped yokes 45a and 45b, respectively and to the yokes 45a and 45b are secured permanent magnets 46a and 46b, respectively. The magnet 46a is arranged such that its north pole is secured to the yoke 45a and its south pole faces yoke 44a, and the magnet 46b is arranged such that its south pole fixes yoke 46b and its north pole faces yoke 44b. It should be noted that the lens driving device 42 is supported movably in the X direction by means of bearings secured to the device 42 and by guides secured to stationary member to which the yokes 45a and 45b are also secured.

By supplying currents to the moving coils 46a and 46b in suitable directions, there are produced forces on the coils for moving the coils in the X direction, so that the lens driving device 42 is moved in the x direction. In this manner, it is possible to move the objective lens 41 over the whole recording area of the opto-magnetic record medium. For instance, when the record medium is constructed in the form of a disc, the lens can be moved in the radial direction of the record disc to perform a so-called seek operation.

In this embodiment, the magnetic field has the distribution shown in FIG. 16. The magnetic flux is leaked from the left hand magnetic circuit to the right hand magnetic circuit and in a region of the record medium near the optical axis of the objective lens 41 the magnetic flux extends substantially in parallel with the plane of the opto-magnetic record medium 47, and the leakage of magnetic field is substantially perpendicular to the magnetization in the record medium. Therefore, the leakage of magnetic field does not have any influence upon the magnetization of information in the magnetic layer 47a of the opto-magnetic record medium 47.

FIGS. 17 to 20 show a fourth embodiment of the opto-magnetic recording apparatus according to the invention. FIG. 17 is a perspective view illustrating the pick-up device including the objective lens and driving mechanism. FIG. 18 is a perspective view showing a movable unit of the pick-up device, and FIG. 19 is a cross section depicting the pick-up device. An objective lens 51 is secured to a supporting frame 52 at a center thereof. On opposite side surfaces of the supporting frame 52 viewed in the Y direction are secured elliptically wound flat focusing coils 53a and 53b. The supporting frame 52 has four fixing projections 54a to 54d formed integrally therewith by molding. To the fixing projections 54a to 54d are secured one end of each leaf spring 55a to 55d, respectively. The other ends of the leaf springs 55a to 55d are secured to fixing projections 56a to 56d, respectively, formed integrally with a fixing member 56. It should be noted that a thin damping rubber layer is applied on each of the leaf springs 55a to 55d, so that the vibration of the movable unit including the objective lens 51, supporting frame 52 and focusing coils 53a and 53b can be absorbed within a short time period.

The pick-up device further comprises a base member 57 made of magnetic material. The base member has upright yokes 57a and 57b formed at both ends thereof. On inner surfaces of the upright yokes 57a and 57b are secured double-poled permanent magnets 58a and 58b, respectively, in such a manner that opposite poles are aligned both in the Z and Y directions. On the outer surface of the upright yoke 57b is secured the fixing member 56 as best shown in FIG. 19.

In the present embodiment, when currents corresponding to the focusing error are supplied to the focusing coils 53a and 53b, there are generated forces in the coil portions which extend in the X direction and thus the supporting frame and objective lens 51 are moved in the Z direction to perform the focusing control. It should be noted that in the present embodiment the tracking control is carried out by swinging the tracking mirror arranged in the optical path from the light source to the objective lens.

Figure 20:
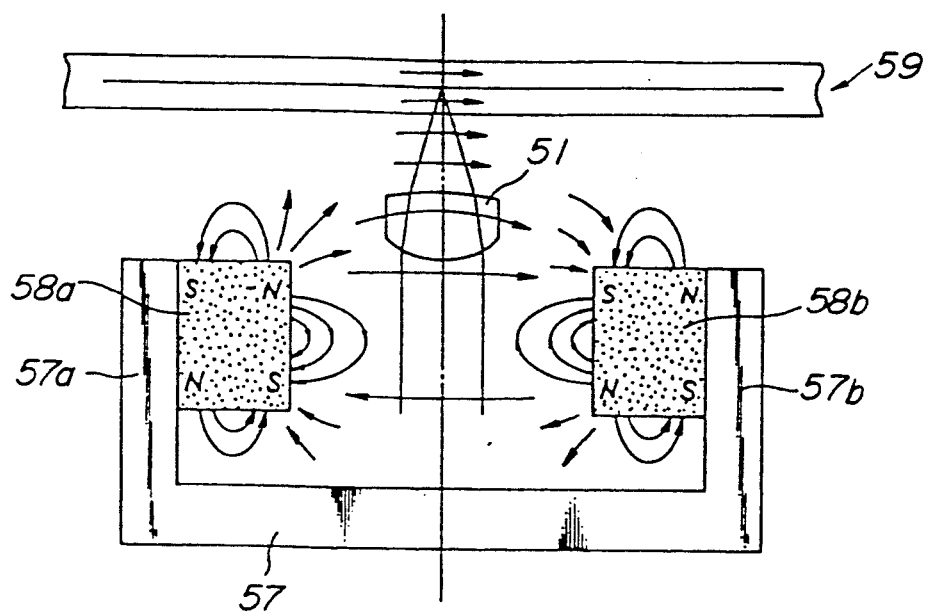
FIG. 20 is a schematic view showing the distribution of the magnetic flux in the apparatus in FIG. 17.

FIG. 20 shows the distribution of the leakage of magnetic field in the present embodiment. Also in the present embodiment, the magnetic flux is leaked from the left hand magnetic circuit to the right hand magnetic circuit and thus the magnetic field near the optical axis of the objective lens 51 becomes substantially perpendicular to the direction of the magnetization in the opto-magnetic record medium 59. Therefore, the leakage of magnetic field does not affect the recording or erasing operation of the apparatus.

In the fourth embodiment just explained above, the magnets 58a, 58b is formed by a double-poled magnet, but they may be constructed by two separate magnets which are arranged in the Z or Y direction.

Further, in the fourth embodiment, there are not provided the inner yokes for forming air gaps in which the focusing coils 53a and 53b are inserted, so that it is not necessary to provide in the supporting frame 52 the recess into which the inner yokes protrude. Therefore, the resonance due to the recess could be hardly produced and the focusing control can be carried out stably. Further, the focusing coils 53a and 53b are faced with the opposite polarity poles of the magnets 58a and 58b, respectively, so that the density of the magnetic flux applied to the focusing coils can be increased to a great extent and thus the very high sensitivity of the focusing control can be attained. In this manner, according to the present invention it is possible to remove the influence of the leakage of magnetic field with or without the inner yokes.

Figure 21:
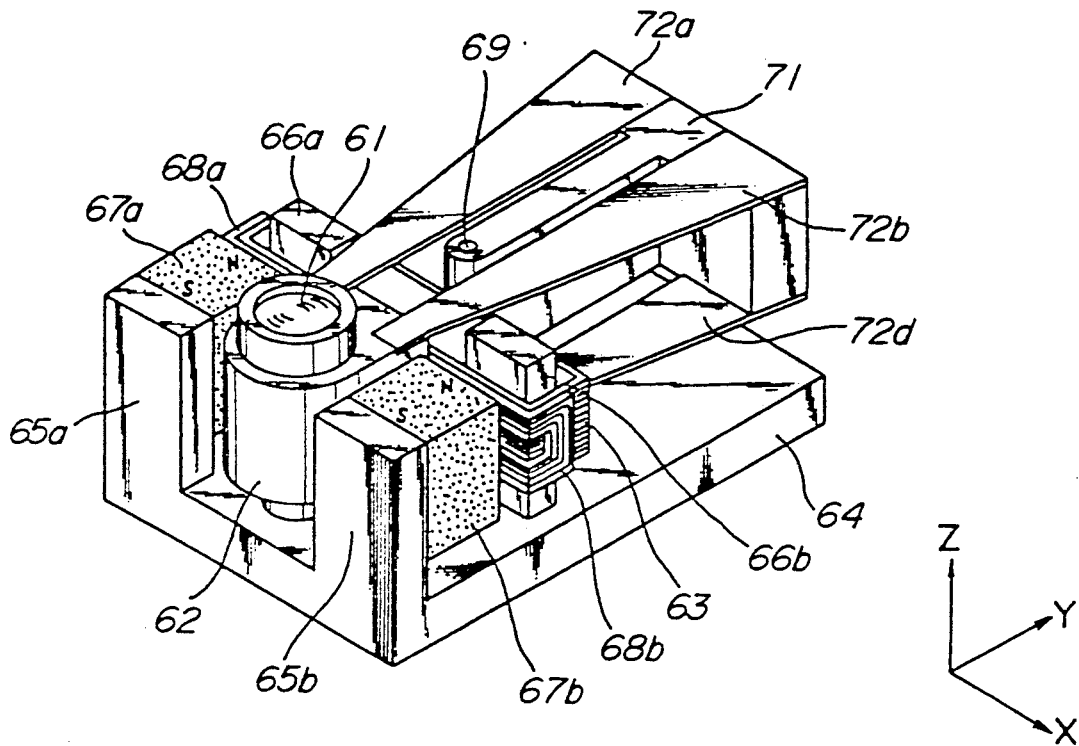
FIG. 21 is a perspective view illustrating a fifth embodiment of the opto-magnetic recording apparatus according to the invention.
Figure 22:
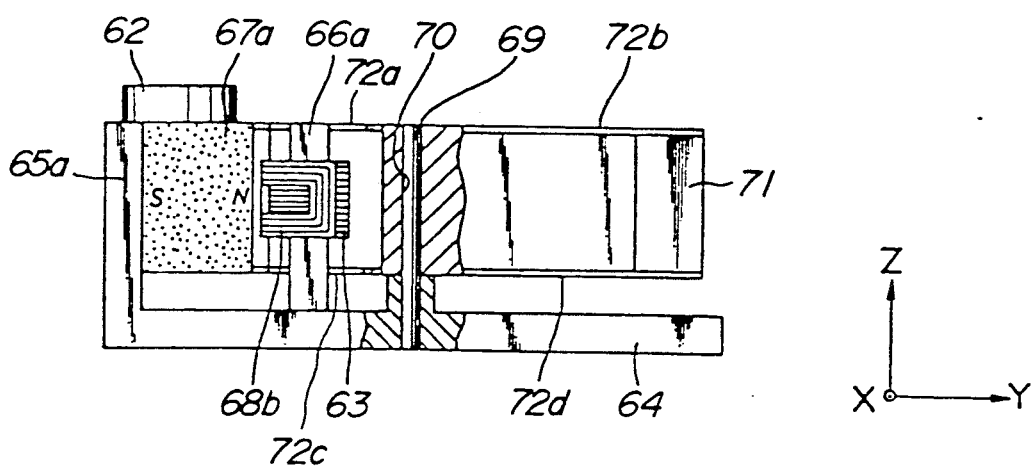
FIG. 22 is a half cross sectional view of the apparatus shown in FIG. 21.
Figure 23:
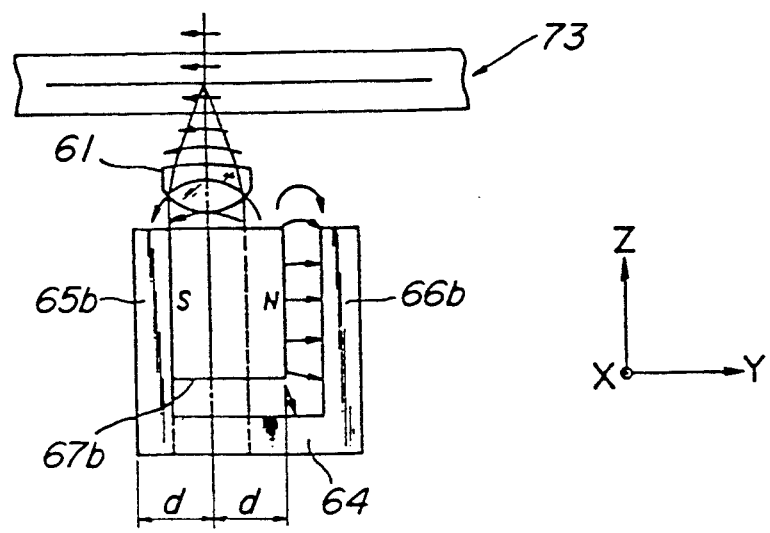
FIG. 23 is a schematic view depicting the distribution of the magnetic flux in the apparatus shown in FIG. 21.

FIGS. 21 to 23 show a fifth embodiment of the opto-magnetic recording apparatus according to the invention. FIG. 21 is a perspective view showing the pick-up device of the apparatus. FIG. 22 is a partially cross sectional view of the pick-up device viewed in the X direction. An objective lens 61 is secured to a supporting frame 62 which has substantially semi-circular configuration and includes a plane parallel to the X-Z plane. To this plane is cemented a focusing coil 63 which is wound in a rectangular shape. The pick-up device further comprises a base 64 made of magnetic material and outer and inner yokes 65a, 65b and 66a, 66b are provided on the base. The inner yokes 66a and 66b are inserted into the space formed in the focusing coil 63, and on inner surfaces of the outer yokes 65a, 65b are secured permanent magnets 67a and 67b. The magnets 67a and 67b are arranged to have the same poles aligned in the Y direction. The objective lens 61 is arranged such that its optical axis is situated at a middle point between the outer surfaces of the outer yokes 65a, 65b and the outer surfaces of the magnets 67a, 67b. In magnetic gaps formed between the magnets 67a, 67b and the inner yokes 66a, 66b are arranged flat tracking coils 68a and 68b which are cemented to the focusing coil 63 at its adjacent corners. That is to say, the tracking coils 68a and 68b are arranged such that one side of each which extends in the Z direction is positioned within the magnetic gaps.

To the base 64 is secured a shaft 69 which extends in the Z direction and the shaft is inserted into a bearing 73 formed in a substantially T-shaped member 71, so that the member 71 can be swung about the shaft 69. On upper and lower surfaces of the T-shaped member 71 are secured one end of each leaf springs 72a to 72d. The other ends of the leaf springs 72a to 72d are fixed to the supporting frame 62. On surfaces of the leaf springs 72a to 72d are applied thin rubber films so that the damping property of the spring machine is improved. In this manner, the supporting frame 62 and objective lens 61 are resiliently supported movably in the focusing direction Z.

When a current corresponding to the focusing error is supplied to the focusing coil 63, the objective lens 61 is moved in the Z direction against the resilient force of the leaf springs 72a to 72d to perform the focusing control. When currents corresponding to the tracking error are supplied to the tracking coils 68a and 68b, there are generated forces in the parts of these coils in the X direction, and thus the objective lens 61 is rotated about the shaft 69 to effect the tracking control. In this manner, it is possible to carry out focusing and tracking control.

It should be noted that a center of gravity of the movable unit including the objective lens 61, supporting frame 62, focusing coil 63, tracking coils 68a, 68b, leaf springs 72a to 72d and rotating member 71 is positioned on a center of the shaft 69, and therefore even if a force in the X direction is applied to the pick-up device, the objective lens 61 does not deviated and is driven stably.

FIG. 23 shows the leakage of magnetic field viewed in the X direction. As shown in FIG. 23, a distance d from the optical axis of the objective lens 61 to the outer surface of the outer yoke 65b is identical with a distance d from the optical axis to the outer surface of the magnet 67b, so that the leakage of magnetic flux from the north pole to the south pole of the magnet becomes substantially parallel with the plane of the opto-magnetic record medium 73. Therefore, the leakage of magnetic field becomes substantially perpendicular to the vertical magnetization in a magnetic record layer in the record medium 73, so that the leakage of magnetic field does not affect the information recording or erasing.

In the fifth embodiment just explained above, the leaf springs 72a to 72d have the trapezoidal shape, but they may be formed in the rectangular shape. Moreover, the coils 63 and 68a, 68b are provided on the supporting frame 62 on the side surface which faces the shaft 69, but they may be arranged on the opposite side surface of the supporting frame. Further the tracking control may be performed by moving the supporting frame in the X direction instead of by rotating the supporting frame. In such a case the supporting frame may be held by a suitable spring mechanism. In the fifth embodiment, the driving magnetic field is generated by the permanent magnet, but it may be produced by an electromagnet.

Figure 24:
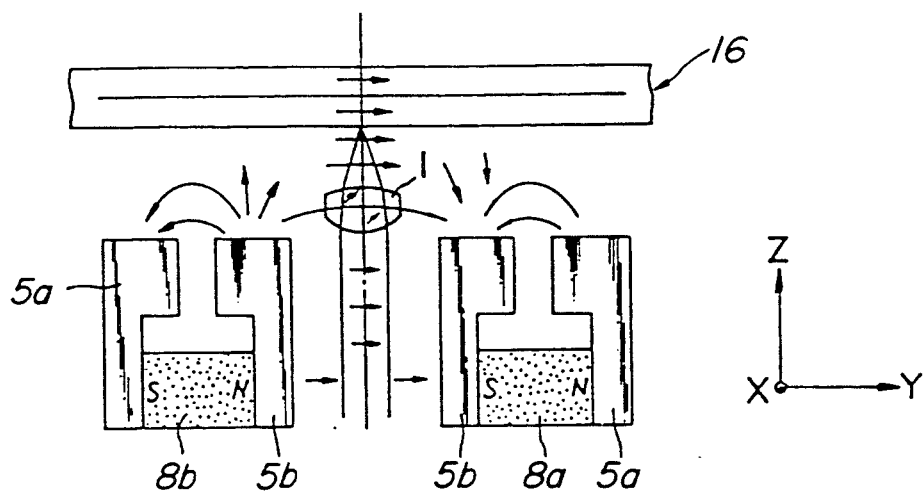
FIG. 24 is a schematic view illustrating a sixth embodiment of the opto-magnetic recording apparatus according to the invention.

FIG. 24 illustrates a sixth embodiment of the opto-magnetic recording apparatus according to the present invention. This embodiment is similar to the third embodiment, so that similar portions are denoted by the same reference numerals used in FIG. 13. In the sixth embodiment, the permanent magnets 8a and 8b are arranged between the outer and inner yokes 5a and 5b, so that the bottom yokes 5c are dispensed with. Also in this embodiment, the leakage of magnetic flux extends substantially in parallel with the plane of the opto-magnetic record medium 17 so that the leakage of magnetic field does not affect the vertical magnetization in the record medium.

FIGS. 25 and 26 show a seventh embodiment of the opto-magnetic recording apparatus according to the invention which is similar to the fifth embodiment shown in FIG. 21, so that similar portions are denoted by the same reference numerals used in FIG. 21. In the seventh embodiment, the permanent magnets 67a and 67b are arranged between the outer and inner yokes 65a, 65b and 66a, 66b. The magnets 67a and 67b are arranged such that their center lines are aligned with center lines of magnetic gaps formed between the outer and inner yokes 65a, 65b and 66a, 66b, and further the optical axis of the objective lens 61 is also aligned with said center lines viewed in the X direction. Therefore, the leakage of magnetic flux extends substantially in parallel with the plane of the opto-magnetic record medium 73 and the leakage of magnetic field does not affect the vertical magnetization in the record medium.

As explained above in detail, in the opto-magnetic recording apparatus according to the present invention, the magnetic circuit for generating the magnetic field which is used to drive the objective lens is provided such that the component of the leakage of magnetic flux in the direction perpendicular to the plane of the opto-magnetic record medium in the region where the recording or erasing is to be performed becomes minimum or substantially zero, so that the leakage of magnetic field does not have a serious influence upon the recording or erasing operation. Further, since it is not necessary to provide any separate parts for shielding the leakage of magnetic field, and thus the size and weight of the pick-up device is not increased at all. Therefore, the driving speed can be increased and the apparatus can be manufactured easily.

What is claimed is:

1. An apparatus for opto-magnetically recording information on an opto-magnetic record medium comprising:
    an objective lens for projecting a light beam onto a portion of said opto-magnetic record medium;
    a supporting frame for supporting said objective lens;
    supporting means for movably supporting said supporting frame in at least a tracking direction, wherein said tracking direction is perpendicular to a direction of an information track on said opto-magnetic record medium and to an optical axis of said objective lens;
    a bias magnetic field generating means for generating a bias magnetic field which is applied to said portion of said opto-magnetic record medium simultaneously with said light beam for recording or erasing information on said opto-magnetic record medium;
    driving means for moving said supporting frame in at least one direction comprising driving magnetic field generating means for generating a driving magnetic field; and
    a plurality of tracking coils secured to said supporting frame,
    wherein said driving magnetic field cooperates with said tracking coils to produce a force for moving said supporting frame in at least said tracking direction, and
    wherein said driving magnetic field generating means is constructed such that a component of said driving magnetic field which is substantially parallel with said bias magnetic field at said portion of said opto-magnetic record medium is a minimum.

2. An apparatus of claim 1, wherein said driving magnetic field generating means comprises first and second magnetic circuits which are arranged symmetrically with respect to an optical axis of the objective lens.

3. An apparatus of claim 2, wherein said first magnetic circuit includes at least one yoke and at least one permanent magnet, said second magnetic circuit includes at least one yoke and at least one permanent magnet coupled with said yoke.

4. An apparatus of claim 3, wherein said permanent magnets of the first and second magnetic circuits are arranged such that the same polarity poles are faced with each other and a sum of magnetic fields generated by said first and second magnetic circuits becomes substantially zero at said portion of the opto-magnetic record medium.

5. An apparatus of claim 3, wherein said permanent magnets of the first and second magnetic circuits are arranged such that opposite polarity poles are faced with each other and a magnetic field extending from said first magnetic circuit to said second magnetic circuit becomes substantially perpendicular to the direction of said bias magnetic field at said portion of the opto-magnetic record medium.

6. An apparatus of claim 1, wherein said supporting means and driving magnetic field generating means are constructed such that the objective lens is movable over a whole width of a record region in the opto-magnetic record medium viewed in a direction perpendicular to an information track in the opto-magnetic record medium.

7. An apparatus for opto-magnetically recording information on an opto-magnetic record medium consisting essentially of:
    an objective lens for projecting a light beam onto a portion of said opto-magnetic record medium;
    a supporting frame for supporting said objective lens;
    supporting means for movably supporting said supporting frame in at least a focussing direction, wherein said focusing direction is perpendicular to a surface of a portion of said opto-magnetic record medium.
    bias medium field generating means for generating a bias magnetic field which is applied to said portion of said opto-magnetic record medium simultaneously with said light beam for recording or erasing information on said opto-magnetic record medium;
    driving means for moving said support frame in at least one direction comprising driving magnetic field generating means for generating a driving magnetic field; and
    a plurality of focusing coils secured to said supporting frame,
    wherein said driving magnetic field cooperates with said focusing coils to produce a force for moving said supporting frame into at least said focusing direction, and
    said driving magnetic field generating means is constructed such that a component of said driving magnetic field which is substantially parallel with said bias magnetic field at said portion of said opto-magnetic record medium is a minimum.

8. An apparatus for opto-magnetically recording information on an opto-magnetic record medium comprising:
    an objective lens for projecting a light beam onto a portion of said opto-magnetic record medium;
    a supporting frame for supporting said objective lens;
    supporting means for movably supporting said supporting frame in at least tracking and focusing directions, wherein said tracking direction is perpendicular to a direction of an information track on the opto-magnetic record medium and to an optical axis of said objective lens, and wherein said focusing direction is perpendicular to a surface of said opto-magnetic record medium:
    bias magnetic field generating means for generating a bias magnetic field which is applied to said portion of said opto-magnetic record medium simultaneously with said light beam for recording or erasing information on said opto-magnetically record medium;

driving means for moving of said supporting frame in at least said tracking and focusing directions comprising a driving magnetic field generating means for generating a driving magnetic field;

a plurality of tracking coils secured to said supporting frame; and a plurality of focusing coils secured to said supporting frame;

wherein said driving magnetic field cooperates with said tracking and focusing coils to produce forces for moving said supporting frame in at least said tracking and focusing directions, and wherein said driving magnetic field generating means is constructed such that a component of said driving magnetic field which is substantially parallel with said bias magnetic field at said portion of opto-magnetic record medium is a minimum.

* * * * *